(No Model.)  
2 Sheets—Sheet 1.
J. A. PAXTON.
REVOLVING RAKE FOR CORNSTALKS.
No. 504,242.  
Patented Aug. 29, 1893.
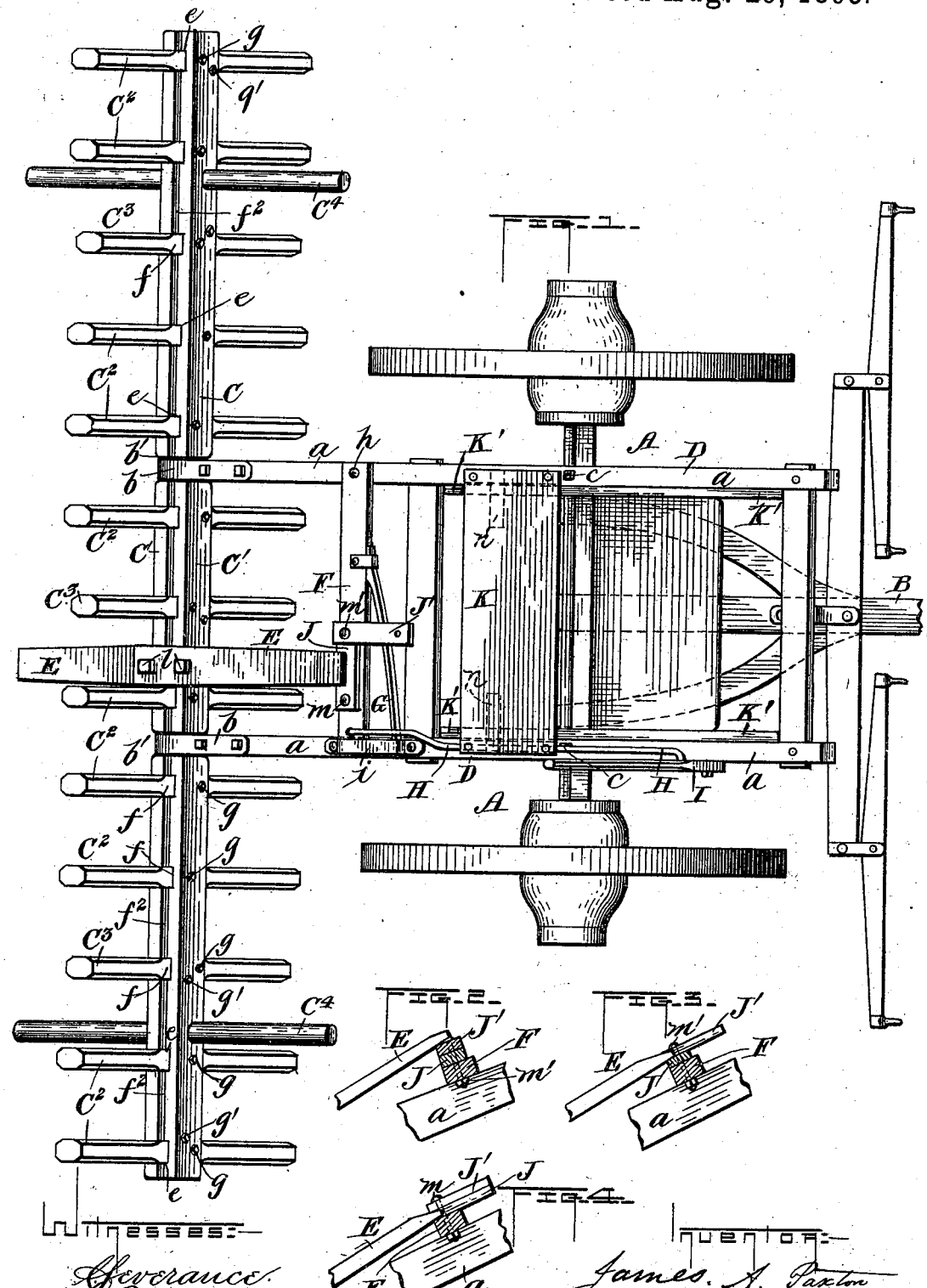
Witnesses:  
Severance  
E. J. Fenwick
Inventor:  
James A. Paxton  
by his Attorneys  
Mason, Fenwick & Lawrence (No Model.)
J. A. PAXTON.
REVOLVING RAKE FOR CORNSTALKS.
No. 504,242. Patented Aug. 29, 1893.
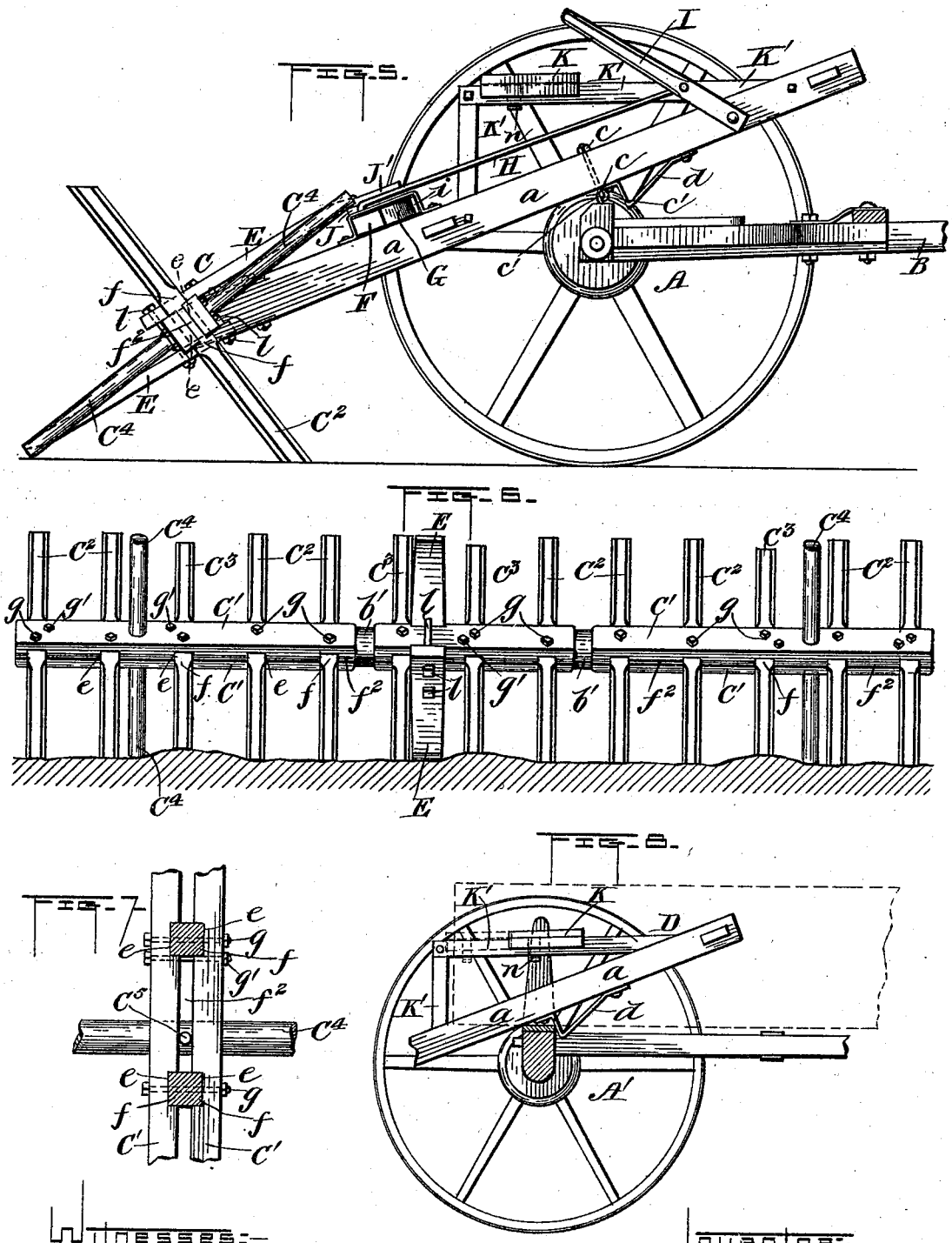

UNITED STATES PATENT OFFICE.

JAMES A. PAXTON, OF ELLSWORTH, ILLINOIS.

REVOLVING RAKE FOR CORNSTALKS.

SPECIFICATION forming part of Letters Patent No. 504,242, dated August 29, 1893.

Application filed November 28, 1891. Serial No. 413,435. (No model.)

*To all whom it may concern:*

Be it known that I, JAMES A. PAXTON, a citizen of the United States, residing at Ellsworth, in the county of McLean and State of Illinois, have invented certain new and useful Improvements in Revolving Rakes for Raking Cornstalks and other Substances; and I do hereby declare the following to be a full, clear, and exact description of the invention, such as will enable others skilled in the art to which it appertains to make and use the same.

My invention relates especially to revolving rakes for gathering corn stalks, and consists in certain novel constructions, combinations and arrangements of parts, whereby this special type, as well as rakes for other analogous uses, are greatly improved, without adding to their complication; they rather being simplified and rendered more convenient, durable and effective.

In the accompanying drawings, Figure 1 is a top view of my improved rake, the tongue of its wheeled carrier being broken off. Fig. 2 is a detail sectional and elevation view of the locking mechanism which holds the rake from revolving, as adjusted to give the teeth the greatest angle with respect to the ground. Fig. 3 is a similar view of the locking mechanism as adjusted to give the teeth a less angle. Fig. 4 is a similar view, illustrating the teeth locked at the least angle. Fig. 5 is a side view of the rake, with one of the wheels of the rake carrier removed; the rake teeth being locked at an angle similar to that illustrated in Fig. 3. Fig. 6 is a front view of the rake head, teeth, turning rods, and locking arms, as seen when adjusted to the angle shown in Figs. 3 and 5. Fig. 7 is a broken horizontal section through a portion of the rake teeth just above the rake head axle, the head being swung up so as to have its toothed-bars vertical and the turning bars or rods horizontal, and Fig. 8 a broken sectional and elevation view, illustrating the manner in which my rake can be hung upon the hind axle of a wagon.

A in the drawings indicates a two wheeled rake carrier having a tongue B. This carrier may be the hind axle of a wagon, as A' Fig. 8, if preferred. The manner of applying the rake to either of these carriers will be presently described.

C is a revolving rake head attached to longitudinal side bars $a$ of a draft and seat frame D, by means of hangers or strap irons $b$. On the under side of the side bars $a$, eye bolts $c$, for connecting the draft frame to the top of the axle, are provided; and in the axle of the carrier A, coinciding and corresponding eye bolts $c'$ are inserted, and to these eye bolts the eye bolts of the carrier are loosely connected, as shown. Forward of the eye bolts $c, c'$ angular hooking irons $d$ are applied to the under side of the side bars $a$ of the draft and seat frame D, for the purpose of connecting the said frame to a hind axle of a wagon A', as illustrated in Fig. 8, whenever the carrier A and the connections $c$, $c'$ are not specially furnished with the rake. The completest construction is to furnish the rake with the carrier A, connections $c$, $c'$ and hooking irons $d$.

The rake head is constructed of two stout timber strips C', each provided with grooves, as $e$, $e$, for the reception of the teeth $C^2$, $C^3$. The depth of the grooves is about one third the thickness of the teeth $C^2$, $C^3$, and thus, when the intermediate squared portions $f$ of the teeth are clamped in between the strips C', an air space $f^2$, about equal to one third the thickness of the teeth will be left between the strips, as illustrated. The teeth and strips are united and firmly clamped together by means of strong bolts $g$, $g'$, a bolt $g$ passing through the strips and a tooth, and a bolt $g'$ through the strips and immediately on one side of the outermost longer and all of the intermediate shorter teeth, as shown, in order to give increased strength at the points where the greatest strain comes. By this special mode of constructing the rake head, the teeth can be secured tightly in place, and no possible lateral deflection from a perpendicular position with the rake head or ground, can occur, they being sustained by the shoulders of the grooves of each strip C', as well as by the bolts passed through and alongside them; and when, by shrinkage, they get loose, they can be tightened again, by screwing up the bolts; and there being an open space $f^2$ between the strips, all along the rake head, except where teeth are applied, water will not collect between the strips and teeth, and cause decay or rot. The teeth $C^3$ are made shorter than the teeth $C^2$, in order that they shall pass over the ridges of corn stalk rows without great labor or strain, while the teeth $C^2$ reach down to the ground in the valleys between the ridges, where the cut stalks lie in bulk, and rake clean. This construction and arrangement of the teeth are most plainly represented in Fig. 6 of the drawings, which view shows the surface of the ground with ridges and valleys. The end, longer, and the intermediate shorter teeth are subjected to the greatest strain on account of the distance of the former from the center of the rake head, and the latter on account of the obstruction offered by the stubble portions of the stalks; and in order to strengthen the rake head at the points mentioned, extra bolts $g'$ are provided on one side of these special teeth, as shown.

The rake head is as usual provided with two bars or rods $C^4$, fastened by pins $C^5$, for insuring its revolution when unlocked and its gathered load is to be discharged. In order that the rake head may turn in its hanger or strap irons $b$, the portions thereof which are encircled by said irons are made cylindrical at $b'$, while all the other portions are flat.

E, E represent locking arms, one applied underneath, and the other on top of the rake head. These arms are fastened upon the rake head by bolts $l$ passed through them and along circular grooves formed in the front and rear of the rake head-strips; by this mode of fastening, the head is not seriously weakened, and yet the arms are held from lateral deflection, by reason of the bolts entering for about half their diameter into the grooves in the strips.

F is a locking bar arranged far enough back for the arms E, respectively, to catch upon it and hold the rake head from revolving. This bar is pivoted at one end as indicated at $h$, while its other end vibrates freely in an elongated loop iron $i$.

G is a spring for pressing and keeping the lock-bar to its locking position; and H is a connecting rod and I a lever by which the force of the spring can be overcome and the locking bar moved forward to an unlocking position. With this arrangement, if either of the arms E has its end resting on the bar F, the rake head will be kept from revolving; and when the bar F is moved forward beyond the end of the arm the rake will be free to revolve.

In order to change the slant or angle of the rake teeth with the ground, step blocks J J' are provided upon the locking bar. The blocks J J' are fitted normally on the bolt pin $m'$, and either or both can be fitted on the two pins $m, m'$. When the block J is to be used alone, it is fitted on both of the pins $m, m'$ and the block J' is moved around, to the right angular position shown in Figs. 1, 3 and 5, on the bolt pin $m'$; and when the two blocks are to be used together so as to increase the angle of the teeth to the ground, the two are fitted on the bolt pins, as shown in Fig. 2,—and when neither of the blocks is used, they are disconnected from the bolt pin $m$ and turned around on pin $m'$ to the position shown in Figs. 1 and 4. In all adjustment of the blocks, they are finally made fast by nuts on the ends of the bolt pins.

K is the driver's seat. It is arranged on triangular supports K', which extend back, and front of the connecting eye bolts, or angular hooking irons. The seat is connected by pendent under hooking angular straps $n, n$, and can slide to a position either forward, or in rear of the said connecting devices; and thus the weight of the driver can be thrown on or off the rake head and teeth accordingly as required for heavy or light work; or as much of his weight as is desirable, can be utilized for keeping the rake down to its work; or in raising the rake to pass obstructions, his weight can be thrown forward of the connecting eye bolts or hooking irons, and thus utilized for this purpose.

What I claim as my invention is—

1. The revolving rake head provided with locking arms, in combination with the pivoted spring locking bar, an auxiliary step locking block applied on the bar and adapted to be swung around on said bar out of, or into range of, the locking arms, for the purpose of changing the inclination of the teeth when locked, connecting rod and lever, substantially as described.

2. The revolving rake head provided with locking arms, in combination with the pivoted spring locking bar, a plurality of auxiliary step locking blocks applied on the locking bar, and adapted to be swung around on said bar out of, or into range of, the locking arms, for the purpose of changing the inclination of the teeth when locked, connecting rod and lever, substantially as described.

In testimony whereof I hereunto affix my signature in presence of two witnesses.

JAMES A. PAXTON.

Witnesses:
J. M. LANGLEY,
WM. VAN GUNDY.